Dec. 31, 1963 M. MAY ETAL 3,116,422

CRYOTRONS WITH FERROMAGNETIC ELEMENTS POSITIONED WITHIN SUPERCONDUCTOR FOR CONCENTRATING FLUX TO PROVIDE CONTROLLED SWITCHING

Filed Nov. 9, 1959

MICHAEL MAY
FREDERICK W. SCHMIDLIN
INVENTORS

BY [signature]

[signature]

ATTORNEYS 3,116,422

CRYOTRONS WITH FERROMAGNETIC ELEMENTS POSITIONED WITHIN SUPERCONDUCTOR FOR CONCENTRATING FLUX TO PROVIDE CONTROLLED SWITCHING

Michael May, Santa Monica, and Frederick W. Schmidlin, Inglewood, Calif., assignors to Thompson Ramo Wooldridge Inc., Los Angeles, Calif., a corporation of Ohio Filed Nov. 9, 1959, Ser. No. 851,788
13 Claims. (Cl. 307—88.5)

This invention relates to cryogenic switching circuits and more particularly to a new and improved switching circuit for selectively rendering a superconductor electrically resistive to control the flow of an electrical current therethrough.

In the investigation of the electrical properties of materials at very low temperatures, it has been found that the electrical resistance of many materials drops abruptly when the temperature of the material is lowered near absolute zero (0° Kelvin). This phenomenon is known as superconductivity and the temperature at which a change occurs from a normally resistive state to a superconductive state is known as the transition temperature.

In view of recent developments in equipment for maintaining electrical circuits at temperatures at which the phenomenon of superconductivity occurs, there has been a great deal of effort expended towards the development of electrical devices utilizing superconductive materials. For example, it has been proposed that an entire digital computer or data processing system may be constructed for operation at a temperature near absolute zero in which information is stored by means of persistent circulating currents around superconductive circuit loops and logical computations are performed by means of gating, switching and logical circuits wherein conductors of superconductive materials, i.e., superconductors, are switched between a superconductive condition and an electrically resistive condition. Circuit elements of a type which are capable of storing persistent circulating currents may be found described in a copending application of Eugene C. Crittenden, Jr., entitled "Superconductive Electrical Circuits," filed June 5, 1957, Serial No. 663,668, and a number of logical circuits utilizing the superconductive circuit loops of the aforesaid copending application may be found described in U.S. Patent No. 2,877,448, issued on March 10, 1959, in the name of James J. Nyberg.

One of the properties of superconductive materials which is utilized in the superconductive circuit loops and logical circuits of the copending Crittenden application and Nyberg patent mentioned above is that which enables a material to be switched from a superconductive condition to an electrically resistive condition in response to a magnetic field which may be produced by a current flow through the superconductor itself. In an effort to develop an electrical switching device which is capable of operation through the switching of a superconductor to an electrically resistive condition by the external application of a magnetic field, there has been developed a device in which a helical conductor is wound about a superconductor in a manner in which current flow through the helical conductor produces a magnetic field which when applied to the superconductor renders the superconductor electrically resistive. The problem of fabricating individual circuit elements requiring separately wound conductors limits the usefulness of such devices since it is essential in the manufacture of relatively complex electrical circuits, such as are found in data processing systems and digital computers, that the devices be simple in construction and reliable in operation. Accordingly, it has been proposed that superconductive electrical circuits may be constructed utilizing thin films of material which may be placed adjacent one another so that a magnetic field generated by current flow through one of the films is applied to an adjacent film.

Where a pair of conductors in the form of strips are placed close together the magnetic field produced by current flow through one of the strips may be distributed on opposite sides of the other strip. One of the strips may be designated as a gate element which is adapted to be switched from a superconductive condition to an electrically resistive condition in response to the cumulative effect of a self-generated magnetic field produced by current flow through the gate element itself and a magnetic field produced by current flow through an adjacent conductor. In switching circuits constructed of adjacent strips of thin films, it is desirable to have the magnetic fields generated by current flow in one conductor applied to a second conductor in the form of a gate element in a manner in which a switching action may be efficiently secured.

Accordingly, it is a principal object of the present invention to provide a new electrical switching circuit in which the magnetic fields produced by current flow through one conductor are concentrated and increased in the region of a second conductor.

It is another object of the invention to provide a new and improved superconductive switching circuit in which the efficiency of operation of the circuit is enhanced by means of ferromagnetic elements.

It is a further object of the invention to provide a new and improved switching circuit in which ferromagnetic elements function to concentrate and increase the magnetic fields applied to a superconductor.

It is still another object of the present invention to provide a new and improved electrical switching circuit in which a superconductor is switched from a superconductive condition to an electrically resistive condition whenever the self-generated magnetic fields produced by current flow through the superconductor are additive with respect to an applied magnetic field.

It is yet another object of the present invention to provide a new and improved electrical switching circuit in which a superconductor is biased by an applied magnetic field derived from current flow through an adjacent conductor in order that the superconducor may be switched to an electrically resistive condition in accordance with the direction of current flow therethrough.

It is an additional object of the present invention to provide a new and improved electrical switching circuit which is capable of rendering a superconductor electrically resistive in response to a concurrence of conditions in which current flow through the superconductor produces a magnetic field which is additive with respect to an applied magnetic field.

Briefly, in accordance with the invention, magnetic fields are concentrated and increased by a ferromagnetic element in a particular region adjacent a gate element in the form of a superconductor which is capable of being switched from a superconductive condition to an electrically resistive condition in response to an applied magnetic field, a self-generated magnetic field produced by current flow therethrough, or the combined effect of an applied magnetic field and a self-generated magnetic field.

In a particular structure in accordance with the present invention, a switching circuit includes a gate element in the form of a superconductor positioned adajcent a control element through which current is passed to generate a magnetic field for application to the gate element. Between the gate element and the conductor at least one ferromagnetic element is positioned to concentrate magnetic fields produced by current flow through the conductor in a manner in which concentrated magnetic fields are applied to the gate element. In one mode of operation, the magnetic fields concentrated in the region of the gate element may be arranged to be sufficiently strong to render the gate element electrically resistive so as to impede the flow of current therethrough. In another mode of operation of the structure in accordance with the invention, the strength of the concentrated magnetic field is arranged to be insufficient in itself to render the gate element electrically resistive so that when current is passed through the gate element in a direction which produces magnetic fields which are additive with respect to the concentrated magnetic fields, the gate element is rendered electrically resistive, and where current is passed through the gate element in a direction in which the respective magnetic fields are subtractive, the gate element remains in a superconductive condition.

In a preferred arrangement, at least two ferromagnetic elements are positioned to define a gap adjacent to which a portion of the gate element is positioned. The concentrated magnetic fields in the gap function either alone or in combination with fields generated by current through the gate element to render a portion of the gate element electrically resistive. The change in resistivity reduces the cross-sectional area of the gate element through which current may flow unimpeded, which in turn effects a concentration of the self-generated magnetic fields produced by current flow through the gate element in a manner which renders more and more of the gate element electrically resistive. The cross-sectional area through which current may flow unimpeded is thereby progressively restricted so that the entire gate element is rendered electrically resistive in a progressive and rapid fashion. Additional ferromagnetic elements may be positioned on a side of the control conductor opposite the gate element to confine the magnetic fields to reduce interaction between adjacent switching circuits as well as for other purposes.

Switching circuits in accordance with the invention may be constructed as a sandwich of conductors, ferromagnetic elements, and superconductors which are deposited by vacuum deposition techniques with electrical insulation layers being interleaved between adjacent elements to maintain electrical isolation.

In accordance with another aspect of the present invention, a superconductive circuit loop may be arranged to sustain a persistent circulating current which generates a magnetic field for application to an adjacent gate element. By means of one or more ferromagnetic elements positioned between the superconductive loop and the gate element, the magnetic fields produced by the persistent current flow are concentrated in the region of the gate element so that the gate element may be rendered electrically resistive to impede the flow of electrical current therethrough, in response to the persistent circulating current magnetic fields taken alone or in response to the combined effect of the presistent circulating current magnetic fields and the self-generated magnetic fields produced by current flow through the gate element.

An arrangement in accordance with the present invention incorporating superconductive circuit loops may be constructed in sandwich form with the superconductive loops, the gate element and the ferromagnetic elements being vacuum deposited one on top of the other with interleaved insulation layers.

In accordance with still another aspect of the present invention, electrical switching circuits may be arranged to apply a magnetic field to one or more gating elements with ferromagnetic field concentrating elements of a high retentivity being disposed adjacent the gating element. Where materials of high magnetic retentivity are employed, the passage of a control current through a control conductor may be arranged to effect a magnetization of the ferromagnetic elements so that a magnetic field is applied to the gate element even after current flow through the control conductor has ceased. Accordingly, a pulse of current through a control conductor produces a magnetic field which is sustained by the ferromagnetic elements for application to a gating element which in turn may be rendered electrically resistive in response to the applied magnetic field alone or in response to the combined effect of the applied magnetic field and a self-generated magnetic field produced by current flow therethrough.

A better understanding of the invention may be had from a reading of the following detailed description and an inspection of the drawings, in which.

Figure 7:
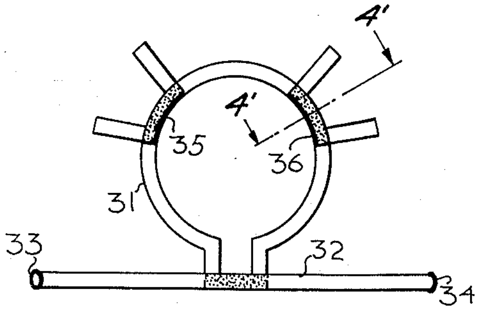
Figures 5, 8:
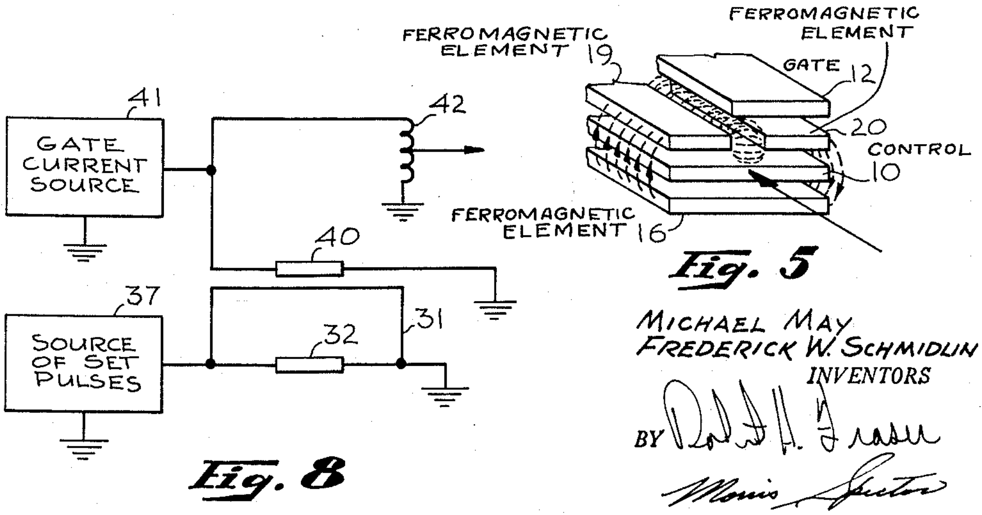
FIG. 5 is a diagrammatic illustration of the magnetic fields produced by current flow through a control conductor where the magnetic fields are concentrated in the region of a gating element by means of ferromagnetic elements positioned between the control conductor and the gating element.

FIG. 7 is a plan view of an alternative arrangement of a switching circuit in accordance with the invention in which magnetic fields produced by persistent circulating current flow around a circuit loop are impressed upon a pair of gating elements; and FIG. 8 is a combined block and schematic circuit diagram of a switching circuit in accordance with the invention from which may be derived an output signal in accordance with the actuation of the switching device in response to the rendering of a gate element electrically resistive.

At temperatures near absolute zero, some materials lose all resistance to flow of electrical current and become perfect conductors. This phenomenon is called superconductivity and the temperature at which the change occurs from a normally resistive state to a superconductive state is called the transition temperature. It has been established that where a superconductive material is held at a temperature below its transition temperature, the superconductive state may be extinguished by the application of an external magnetic field to the material or by current flow through the material in an amount in excess of a critical value. For example, in FIG. 1 of the drawings, the relationship of the transition temperature of a particular material as a function of an applied magnetic field is shown. In the absence of a magnetic field, the point at which the curve intersects the abscissa is the transition temperature at which the material becomes superconductive. For values of temperature and magnetic field falling beneath the curve, the particular material is superconductive, while for values of temperature and magnetic field falling above the curve, the material possesses electrical resistance.

Figure 1:
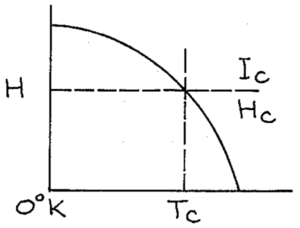
FIG. 1 is a graphical illustration of the relationship between the transition temperature and an applied magnetic field for a particular superconductive material.

In FIG. 1, the dashed line $T_c$ represents a constant temperature line. For magnetic fields greater than a critical value corresponding to the point of intersection between the line $T_c$ and the curve, the particular material is electrically resistive when held at the temperature $T_c$. However, for a magnetic field having a value less than the point of intersection between the line $T_c$ and the curve, the material is superconductive.

Since a current flowing in the material has an effect upon the transition temperature similar to a magnetic field, FIG. 1 also represents the effect of varying the current flowing through the material. For currents in excess of a critical current value ($I_c$), the material is normally resistive, and for currents less than a critical current value, the material is superconductive. It will be appreciated that when a superconductive material is held at a constant temperature, the combined effect of an applied magnetic field from an external source and the value of current flow through the superconductor itself determines whether the superconductor is in an electrically resistive or a superconductive condition.

Figure 2:
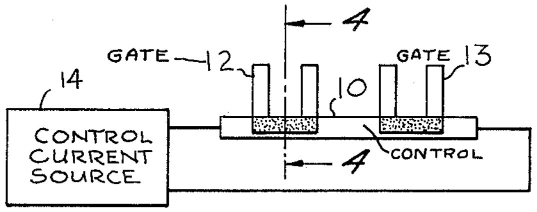
FIG. 2 is a plan view of a switching circuit in accordance with the invention in which current flow through a control conductor produces a magnetic field which is impressed upon a pair of gating elements.

FIG. 2 illustrates one type of cryogenic switching circuit in accordance with the invention which is adapted to operate in accordance with the foregoing principles. The circuit of FIG. 2 includes a control conductor 10 which is adapted to pass current from a current source 14. Disposed adjacent the control conductor 10 is a pair of gate elements 12 and 13, each of which is constructed of a material which is superconductive at the temperature of operation of the circuit, but which is capable of being rendered electrically resistive in response to magnetic fields produced by current flow through the conductor 10, by self-generated magnetic fields produced by current flow through the gate elements themselves, or by the combined effect of applied and self-generated magnetic fields.

The gate elements 12 and 13 present substantially zero resistance to the flow of current from external circuitry (such as the gate current source 41 shown in FIG. 8) while in a superconductive condition. In contrast, the flow of gating current is impeded by the gate elements 12 and 13 whenever the gate elements are in an electrically resistive condition, such as may be produced by a magnetic field in excess of the critical magnetic field value which may be generated by current from the control current source 14 flowing in the control conductor 10, for example.

Figure 3:
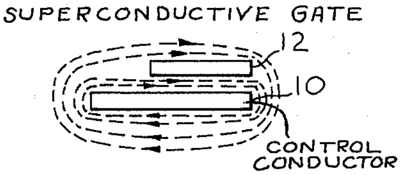
FIG. 3 is a diagrammatic illustration of the magnetic fields produced by current flow through a control conductor which is positioned adjacent a gating element.

As described thus far, the arrangement of FIG. 2 of the drawing suffers from the disadvantage that the magnetic fields produced by current flow through the control conductor 10 are not applied to the gate elements 12 and 13 in a manner in which effective switching may be accomplished. For example, FIG. 3 illustrates diagrammatically the magnetic fields produced by current flow through the control conductor 10 in a direction into the sheet of drawings. As may be seen in FIG. 3, the magnetic field lines are of like direction, both above and below the gate element 12. The result is that magnetic fields generated by current flow through the gate element 12 itself are additive with respect to the applied magnetic fields on one surface of the gate element 12, while the self-generated magnetic fields are subtractive with respect to the applied magnetic field on the opposite surface of the gate element 12. Accordingly, a cancellation of the effect of the self-generated magnetic fields occurs so that it is difficult to secure efficient switching of the gate element 12 in response to current flow therethrough.

Figure 4:
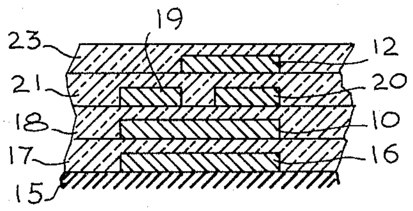
FIG. 4 is a sectional view taken along line 4—4 of FIG. 2.

In accordance with one aspect of the present invention, the aforementioned difficulty is overcome by means of one or more ferromagnetic elements positioned between the control conductor and the gate elements. For example, in the cross-sectional view of FIG. 4, a cryogenic switching device in accordance with the invention may be constructed by vacuum deposition techniques in which a number of thin films of material are deposited on top of each other with interleaved insulating layers. In the configuration illustrated in FIG. 4, a first ferromagnetic element 16 is deposited on a base plate 15 with a first insulating layer 17 being deposited over the ferromagnetic element 16. On top of the insulating layer 17 a control conductor 10 is deposited with a second insulating layer 18 covering the control conductor 10. On top of the insulating layer 18, a pair of ferromagnetic elements 19 and 20 are deposited with a third insulating layer 21 being deposited to cover the ferromagnetic elements 19 and 20. As illustrated in FIG. 4, the ferromagnetic elements 19 and 20 define a gap which functions in the manner described below to concentrate magnetic fields produced by current flow through the control conductor 10 in a desired region. On top of the insulating layer 21 and immediately adjacent the gap between the ferromagnetic elements 19 and 20 is deposited a gate element 12 which is constructed of a suitable superconductive material having a configuration which is capable of being switched from a superconductive condition to an electrically resistive condition in response to the combined effect of magnetic fields concentrated in the gap between the ferromagnetic elements 19 and 20 and self-generated magnetic fields produced by current flow through the gate element itself. On top of the gate element 12 there may be deposited a fourth insulating layer 23 which completes the sandwich construction within which the ferromagnetic field concentrating elements 19 and 20 are disposed between the control conductor 10 and the gate element 12.

The diagrammatic illustration of FIG. 5 shows the magnetic field lines produced in a superconductive switching device in accordance with the invention utilizing ferromagnetic elements to effect a concentration of fields in a desired region. Thus, in FIG. 5, current flow through the control conductor 10 in the direction indicated generates a magnetic field which passes through the ferromagnetic elements 19 and 20, thereby functioning to concentrate the magnetic fields in a region adjacent the lower surface of the gate element 12. Due to the gap between the ferromagnetic elements 19 and 20, the magnetic fields are applied to a portion of the bottom surface of the gate element 12. Furthermore, in view of the low reluctance path afforded by the ferromagnetic elements 19 and 20, the magnetic field lines are efficiently applied to the gate element 12, so that the efficiency of the device is enhanced.

An additional ferromagnetic element 16 positioned below the control conductor 10 in the drawing also affords a low reluctance path for magnetic fields generated by current flow through the control conductor on the opposite side of the control conductor from the gate element 12. By this means, the magnetic field in the gap between the ferromagnetic elements 19 and 20 is increased with the same value of current flow through the control conductor so that the efficiency of the device is further enhanced.

Referring again to FIG. 2, and keeping in mind that the magnetic fields produced by current flow through the control conductor 10 are substantially concentrated on one surface of each of the gate elements 12 and 13, it will be recognized that current flowing through the gate elements 12 and 13 from associated circuitry produces self-generated magnetic fields in the region of the gap between the ferromagnetic elements 19 and 20. Where the self-generated magnetic fields in the region of the gap are additive with respect to the magnetic fields produced by current flow through the control conductor 10, and the total value of the combined magnetic field applied to the gate element exceeds the critical magnetic field value, at least a portion of the gate element is rendered electrically resistive. When any portion of the gate element is rendered electrically resistive, the cross-sectional area which remains superconducting is reduced so that the self-generated magnetic fields are concentrated in a smaller and smaller region which progressively operates to render the entire gate element electrically resistive along that portion of its length to which concentrated magnetic fields are applied in response to current flow through the control conductor 10.

In contrast, where the current passed through the gate elements 12 and 13 from associated circuitry produces self-generated magnetic fields which are subtractive with respect to the applied magnetic fields appearing in the gap between the ferromagnetic elements 19 and 20, the gate elements 12 and 13 remain in a superconductive condition so long as the net field attributable to self-generated magnetic fields is below the critical magnetic field value.

Although the operation of a cryogenic switching circuit in accordance with the invention has been described above for a mode of operation in which a gate element is capable of being switched to an electrically resistive condition responsive to both self-generated and applied magnetic fields, it will be appreciated that through a variation in the relative magnitudes of the magnetic fields, the cryogenic switching device may be arranged to be operable in response to self-generated magnetic fields taken alone, applied magnetic fields taken alone, or combined magnetic fields as desired.

In accordance with another aspect of the invention, the ferromagnetic elements 19 and 20 may be constructed of a material having a high magnetic retentivity. With high retentivity magnetic field concentrating elements, the current flow through the control conductor 10 effects a magnetization of the elements 19 and 20 which continues in effect even after current flow through the control conductor 10 has ceased. Accordingly, magnetic fields continue to be applied to the gate element 12 even after the cessation of control current flow. Again, the conductive state of the gate element 12 may be determined by the current flow through the gate element alone, the applied magnetic fields emanating from the magnetized elements 19 and 20, or the combined effect of the self-generated and applied magnetic fields by a suitable selection of the relative values of the magnetic fields so as to produce a magnetic field in excess of the critical magnetic field value when the gate element is desired to be in an electrically resistive condition and a net magnetic field less than the critical magnetic field value when the gate element is desired to be in a superconductive condition. By passing a current through the control conductor 10 in a reverse direction, the field concentrating elements 19 and 20 may be returned to their unmagnetized condition or may be magnetized to produce concentrated magnetic fields of opposite polarity.

Although the arrangement to FIG. 2 contemplates switching of one or more gate elements in response to current flow through the control conductor 10 emanating from a control current source 14, the principles of the present invention may be applied as well to a switching arrangement in connection with a persistent circulating current sustaining device such as that described and claimed in the patent application of Eugene C. Crittenden, Jr., filed June 5, 1957, Serial Number 663,668, entitled "Superconductive Electrical Circuits." One such arrangement is illustrated in FIG. 6 and an alternative configuration is shown in FIG. 7.

Figure 6:
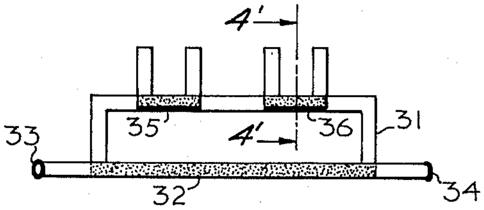
FIG. 6 is a plan view of a switching circuit in accordance with the invention in which magnetic fields generated by persistent circulating current flow around a circuit loop are impressed upon a pair of gating elements.

In FIG. 6 a first superconductor 31 and a second superconductor 32 are connected to form a circuit loop. Both the superconductor 31 and the superconductor 32 are constructed of materials which are superconductive at the operating temperature of the circuit. However, the superconductor 32 is constructed to have a critical current value at which the superconductor switches from a superconductive state to a resistive state lower than the critical current value at which the superconductor 31 switches from a superconductive state to a resistive state. Preferably, the critical current value of the superconductor 32 may be lower than that of the superconductor 31 by a factor of two.

In operation, the electrical circuit of FIG. 6 is held at an operating temperature below the transition temperatures in the absence of a magnetic field of both the superconductor 31 and the superconductor 32. Since the superconductor 32 is arranged to have a critical current value lower than the critical current value of the superconductor 31, the entire circuit loop is superconductive for current flow less than the critical current value of the superconductor 32. Accordingly, no electrical resistance is presented to current flow less than the critical current value of the superconductor 32 and once such a current is established, the current flows around the loop indefinitely. Thus, a persistent circulating current may be established in the circuit loop which will continue to flow so long as the superconductor 31 and the superconductor 32 remain superconducting. However, since the superconductor 32 has a critical current value lower than that of the superconductor 31, the superconductor 32 is subject to being made electrically resistive by current flowing around the loop without affecting the superconductive state of the superconductor 31 where the value of the current is in excess of the critical current value of the superconductor 32 and is lower than the critical current value of the superconductor 31.

In the arrangement of FIG. 6, electrical pulses for initiating a persistent circulating current may be applied to the circuit loop via the terminals 33 and 34. If the current passed through the superconductor 32 is in excess of the critical current value of the superconductor 32, the superconductor 32 becomes electrically resistive and the current within the circuit decays to a level approximately equal to or slightly less than the critical current value of the superconductor 32. At this point, the superconductor 32 switches from an electrically resistive state to a superconductive state. As the energizing currents are removed, a reverse current is set up in the loop which continues to flow around the circuit loop as a persistent circulating current so long as the superconductor 32 and the superconductor 31 remain superconducting. Therefore, information may be stored in the circuit loop of FIG. 6 as a function of the direction of persistent circulating current flow by applying pulses to the terminals 33 and 34 of a selected polarity.

In order to reverse the direction of current flow within the circuit loop, a current pulse may be applied to the terminals 33 and 34. When the current pulse is additive with respect to a persistent circulating current flow through the superconductor 32, the total amount of current becomes sufficiently large to render the superconductor 32 electrically resistive so that a voltage appears between the terminals 33 and 34. As a result of the voltage across the superconductor 32, the direction of persistent circulating current flow within the circuit loop is reversed. Thus, after the voltage appears, a persistent circulating current flows around the circuit loop in a direction opposite to the direction of persistent circulating current flow prior to the application of the pulse to the terminals 33 and 34.

On the other hand, a pulse applied to the terminals 33 and 34 which produces a current flow which is subtractive with respect to the persistent circulating current flowing through the superconductor 32 does not render the superconductor 32 electrically resistive so long as the net current flow does not exceed the critical current value of the superconductor 32. Accordingly, no voltage appears across the superconductor 32 in the latter case, and the persistent circulating current within the circuit loop continues to flow in the same direction as before. By detecting the presence or absence of a voltage across the superconductor 32, the direction of persistent circulating current flow may be ascertained.

One or more gate elements such as the gate elements 35 and 36 may be disposed adjacent the superconductor 31 so that the flow of persistent circulating current around the circuit loop formed by the superconductors 31 and 32 applies a magnetic field to the gate elements 35 and 36 in a manner similar to that described above in connection with FIG. 2. The sandwich construction of FIG. 4 may be employed in the fabrication of the persistent current switching circuit of FIG. 6 with one or more ferromagnetic elements being disposed between the gate elements 35 and 36 and the superconductor 31. Therefor, the cross-sectional view of FIG. 4 also represents a section taken along line 4'—4' of FIG. 6, with the superconductor 31 corresponding to the control conductor 10 of FIG. 4, the gate element 36 of FIG. 6 corresponding to the gate element 12 of FIG. 4, and ferromagnetic field concentrating elements being positioned between the superconductors. As before, the device may be arranged so that the gate elements are responsive to self-generated magnetic fields taken alone, applied magnetic fields arising from persistent circulating current flow around the circuit loop, or the combined effect of applied and self-generated magnetic fields.

FIG. 7 illustrates an alternative arrangement of a persistent circulating current device in which magnetic fields generated by persistent circulating current flow are applied to one or more gating elements. The configuration of FIG. 7 is included here for the purpose of illustrating that the configurations of each of the several component parts of the switching circuit need not be in any particular form so long as substantially the same functions are performed. Accordingly, like reference characters have been used in FIGS. 6 and 7 to denote corresponding parts of the apparatus having similar functions.

In one particular arrangement of a persistent circulating current device following the configuration of FIG. 7, persistent circulating currents are established around the circuit loop formed by the superconductors 31 and 32 by means of setting coils which are inductively coupled to the superconductor 31. A full description of a persistent circulating current device utilizing inductively coupled setting coils in the configuration of FIG. 7 may be found in a copending U.S. patent application of Frederick W. Schmidlin, Serial Number 826,094, filed July 9, 1959, entitled "Persistent Current Superconductive Circuits." However, for the purposes of the present discussion, it is sufficient to say that one or more setting coils may be included in a sandwich construction along with ferromagnetic field concentrating elements which effect a concentration of magnetic fields in selected regions in accordance with the invention.

The electrical switching circuits of the present invention have particular usefulness in controlling the flow of current to an output circuit in accordance with the direction of current flow through a control conductor. For example, in FIG. 8 there is shown an arrangement in which the present invention may be employed to achieve a control of the flow of gate current in accordance with the direction of current flow established in a persistent circulating current device in which a superconductive loop comprising the superconductors 31 and 32 receives set pulses from a source of set pulses 37.

As described above, a persistent circulating current may be established around a circuit loop of the superconductors 31 and 32 in accordance with the polarity of the set pulses. By constructing the switching device of FIG. 8 as set forth above utilizing ferromagnetic elements for the concentration of magnetic fields produced by persistent circulating current flow, a concentrated magnetic field may be applied to a gating element 40 which receives gate current from a gate current source 41. When the combined effect of the gate current flowing through the gating element 40 and the persistent circulating current flow produces magnetic fields which are below the critical magnetic field value, the gating element 40 is in a superconductive condition so that substantially all of the current from the gate current source 41 passes to ground.

In contrast, whenever the gating element 40 is rendered electrically resistive in response to the concentrated magnetic fields produced by persistent circulating current flow acting in combination with the self-generated magnetic fields produced by gate current flow, the gating element 40 is rendered electrically resistive so that a substantial portion of the current from the gate current source 41 is diverted to an output circuit which in the arrangement of FIG. 8 is illustrated to be the winding 42 of an autotransformer. By taking the output current from a tap on the autotransformer 42 as illustrated, a current may be derived which may be applied to a subsequent gating element in the same manner as that illustrated in FIG. 8 with the autotransformer 42 functioning as the gate current source 41.

In the switching circuits described above and shown in FIGS. 6 and 7 including a superconductive loop, a signal may be derived representing the direction of persistent circulating current flow in the superconductive circuit loop on a non-destructive basis. The direct sensing of the direction of persistent circulating current flow by applying a read pulse to the superconductive loop effects a reversal of the persistent circulating current flow whenever the reading pulse is additive with respect to the persistent circulating current flow through the superconductor 32 designated as the resistance element. That is, the superconductor 32 is rendered electrically resistive in response to the combined current therethrough which exceeds its critical current value. The result is that a voltage pulse is produced across the superconductor 32 and a reversal of the current flow about the circuit loop results. However, by utilizing an arrangement such as that of FIG. 8, the combined effect of self-generated and persistent circulating current produced magnetic fields may be arranged so that in one direction of persistent circulating current flow the gating element 40 is electrically resistive and in the opposite direction of persistent circulating current flow the gating element 40 is superconductive. Accordingly, by sensing the current passed to the output circuit the direction of persistent circulating current flow may be ascertained without effecting a reversal of the persistent circulating current flow and a consequent destruction of the stored information no matter what the direction is of the persistent circulating current flow.

By way of example, in the construction of cryogenic switching circuits in accordance with the invention, the gating elements may each comprise a layer of a suitable superconductive material such as tin or indium having a thickness of the order of 5000 Angstrom units and a width of .010 inch. The control conductors may comprise a layer of electrically conductive material which preferably may be superconductive to minimize losses in the control circuit. A layer of lead having a thickness of the order of 5000 Angstrom units is suitable.

The ferromagnetic field concentrating elements may be constructed of a nickel-iron alloy for a low reluctance arrangement. In the alternative, a nickel-cobalt alloy may be employed where a high magnetic retentivity is desired, so that the ferromagnetic elements may be magnetized by the flow of current through a control conductor. As in the case of the gating and control elements, the ferromagnetic elements may be formed by vacuum deposition techniques in a thickness of from 200 Angstrom units to 5000 Angstrom units, for example. With respect to the gap between the ferromagnetic field concentrating elements, a dimension should be selected which is less than the width of the gating element in order that the magnetic fields may be concentrated on a portion of the gating element. For example, the gap may have a dimension equal to W/3, where W equals the width of the gating element.

Where the control conductor forms a part of a persistent circulating current device, such as is illustrated above in FIGS. 6 and 7, the superconductor 31 may be constructed of lead having a thickness of 5000 Angstrom units and a width of .010 inch. The other superconductor 32 may be constructed of tin which may be vacuum deposited in a thickness of 6000 Angstrom units, a length of 3/16 inch and a width of .008 inch.

At a temperature of operation of 3° Kelvin, the gate element may be constructed of indium which has a critical magnetic field value at that temperature of about 50 gauss, while the switchable superconductor 32 may be constructed of tin which has a critical magnetic field value at that temperature of about 100 gauss. Thus, the gating element may be switched to an electrically resistive condition in response to magnetic fields without affecting the superconductive state of superconductor 32. Where a switching device in accordance with the invention is constructed in sandwich form as illustrated in FIG. 4, each of the several elements may be deposited in turn on a suitable base plate such as glass or mica with an insulation layer being deposited between each pair of adjacent elements. One suitable material for the insulation is zinc sulphide which may be vacuum deposited with a thickness of the order of 30,000 Angstrom units, although it will be appreciated that the minimum thickness of insulation commensurate with maintaining an electrical separation between the components is to be desired.

Although individual cryogenic switching circuits in accordance with the invention have been described in detail above, it is contemplated that in actual operating systems a relatively large number of such circuits may be interconnected to perform logical manipulations and computations, as for example, in a digital computer and data processing system. Thus, the gating elements of a number of separate switching devices may be connected in series, in parallel or in series-parallel in order to perform desired logical operations.

In operation, circuits in accordance with the present invention may be maintained at a suitable low operating temperature by immersion in a coolant such as liquid helium. In a preferred cooling arrangement, an exterior insulated container of liquid nitrogen may be provided within which an inner insulated container is suspended for holding liquid helium which maintains the circuits of the invention at the proper operating temperature. When the inner container is open, a temperature of 4.2° Kelvin is maintained which is the boiling point of helium. By sealing the top of the container and employing a vacuum pump and a pressure regulation valve, the pressure within the chamber may be lowered so as to obtain other temperatures. Connection to the circuits within the liquid helium may be made by means of lead-in wires which may also be constructed of a superconductive material within the cooled region to minimize resistance.

It is intended that the above detailed description of various arrangements of cryogenic switching devices in accordance with the invention be by way of example only to enable the invention to be employed wherever desired by a suitable application of the principles thereof. Accordingly, any and all modifications, variations or equivalent alternative structures falling within the scope of the annexed claims should be considered to be a part of the invention.

What is claimed is:

1. A superconductive circuit including the combination of a current carrying conductor, a gate element positioned adjacent the conductor, said gate element being constructed of a superconductive material which is capable of being switched from a superconductive condition to an electrically resistive condition in response to the combined effect of current flow therethrough and an applied magnetic field, means passing currents through the current carrying conductor which produce magnetic fields, and at least one ferromagnetic element disposed between the conductor and the gate element for concentrating magnetic fields produced by current flow through the conductor in a region of the gate element corresponding to a portion only of the cross sectional configuration of the gate element whereby the gate element may be switched from a superconductive condition to an electrically resistive condition in response to a concurrence of current flow through the gate element in a direction which produces magnetic fields which are additive with respect to the magnetic fields attributable to current flow through the conductor in the region of the gate element.

2. A superconductive switch including the combination of a gate element constructed of a superconductive material which is capable of being switched from a superconductive condition to an electrically resistive condition in response to the combined effect of an applied magnetic field and a magnetic field produced by current flow therethrough, at least one ferromagnetic element disposed adjacent the gate element, and means for establishing magnetic fields which are concentrated by the presence of the ferromagnetic element in a region of the gate element corresponding to a portion only of the cross sectional configuration of the gate element whereby the gate element is capable of being switched to an electrically resistive condition in response to a flow of current therethrough in a direction which produces a magnetic field which is additive with respect to the magnetic field in the region in which the ferromagnetic effects a concentration.

3. A superconductive switching device including the combination of a gate element constructed of a superconductive material which is capable of being switched from a superconductive condition to an electrically resistive condition in response to the application of a magnetic field, at least one ferromagnetic element disposed adjacent the gate element for concentrating magnetic fields in a region of the gate element corresponding to a portion only of the cross sectional configuration of the gate element, and means for establishing magnetic fields within the ferromagnetic element whereby the gate element may be selectively rendered electrically resistive.

4. A superconductive switching device including the combination of a gate element constructed of a superconductive material, a current carrying conductor spaced apart from the gate element, and a plurality of ferromagnetic elements disposed between the current carrying conductor and the gate element whereby magnetic fields produced by the flow of current through the conductor are concentrated in a region of the gate element corresponding to a portion only of the cross sectional configuration of the gate element in response to which the gate element may be selectively rendered electrically resistive.

5. A superconductive switching device including the combination of a current carrying conductor, a gate element spaced apart from the current carrying conductor, said gate element being constructed of a superconductive material which is capable of being switched from a superconductive condition to an electrically resistive condition in response to a magnetic field, at least two ferromagnetic elements disposed between the current carrying conductor and the gate element, said ferromagnetic elements being positioned to define a magnetic gap within which magnetic fields are concentrated for application to a portion only of the cross sectional configuration of the gate element, and means passing currents through the gate element which render the gate element electrically resistive whenever the magnetic fields produced by the flow of current through the gate element are additive with respect to the magnetic fields produced in the gap between the ferromagnetic elements.

6. A superconductive switching device constructed in the form of a sandwich including the combination of a first layer comprising an electrical conductor which is capable of producing magnetic fields in response to current flow therethrough, a second layer positioned adjacent the first layer comprising at least one ferromagnetic element which is adapted to concentrate the magnetic fields produced by current flow through the conductor of the first layer in a selected region, and a third layer positioned adjacent the second layer comprising a superconductor, a portion only of the cross sectional configuration of which is disposed in the region of the concentrated magnetic fields with the superconductor being capable of being switched from a superconductive condition to an electrically resistive condition in response to the concentrated magnetic fields.

7. A superconductive switching device constructed in the form of a sandwich comprising the combination of a first layer including a current carrying conductor, a second layer including at least two ferromagnetic elements spaced apart to form a gap within which magnetic fields are concentrated, a third layer including a superconductor, a portion only of the cross sectional configuration of which is positioned adjacent the gap formed between the two ferromagnetic elements whereby the concentrated magnetic fields in the gap are applied to the superconductor in response to which the superconductor is capable of being rendered electrically resistive.

8. A superconductive switching device including the combination of a first conductor which generates magnetic fields in response to current flow therethrough, a second conductor disposed adjacent the first conductor which also generates magnetic fields in response to a current flow therethrough, said second conductor being constructed of a superconductive material which is capable of being switched from a superconductive condition to an electrically resistive condition in response to an applied magnetic field, and a pair of ferromagnetic elements disposed between the first and second conductors within the region of the magnetic fields produced by current flow through the first conductor, said ferromagnetic elements being spaced apart to form a gap in a region of the second conductor corresponding to a portion only of the cross sectional configuration of the second conductor within which magnetic fields generated by current flow through the first conductor are concentrated, said second conductor being so oriented with respect to the gap between the ferromagnetic elements that in one direction of current flow through the second conductor the magnetic fields produced by current flow through the first and second conductors are additive in the region of the gap and in the opposite direction of current flow through the second conductor the magnetic fields generated in the region of the gap are subtractive whereby at least a portion of the second conductor is rendered electrically resistive whenever the magnetic fields appearing in the region of the gap are additive.

9. A gating device for controlling the flow of electrical currents including the combination of a persistent circulating current loop, at least one gate element disposed adjacent the loop, at least one ferromagnetic element positioned between the gate element and the loop for concentrating magnetic fields produced by current flow within the loop in a region of the gate element corresponding to a portion only of the cross sectional configuration of the gate element, said gate element being constructed of a superconductive material which is capable of being rendered electrically resistive in response to an applied magnetic field whereby the concentrated magnetic field provided by the ferromagnetic elements enables the gate element to be rendered electrically resistive in response to current flow therethrough in one direction only.

10. An electrical switching circuit including the combination of a superconductive circuit loop which is capable of sustaining a persistent circulating current flow which produces a magnetic field, a gate element comprising a superconductor which is capable of being rendered electrically resistive in response to an applied magnetic field, said gate element being disposed adjacent the superconductive loop, a pair of ferromagnetic elements positioned between the gate element and the superconductive loop for concentrating magnetic fields produced by persistent circulating current flow around the loop in a region of the gate element corresponding to a portion only of the cross sectional configuration of the gate element, and means for passing current through the gate element which renders the gate element electrically resistive whenever the magnetic fields produced by the current flow therethrough are additive with respect to the magnetic fields applied thereto by means of the ferromagnetic elements.

11. A superconductive gating circuit including the combination of a support base, a layer of ferromagnetic material deposited upon the support base, a first layer of insulating material deposited on top of the ferromagnetic layer, an electrical conductor deposited on top of the first insulating layer in a position adjacent the first ferromagnetic layer, a second insulating layer deposited on top of the electrical conductor, at least two ferromagnetic field concentrating elements deposited on top of the second insulating layer adjacent the electrical conductor and defining a gap within which magnetic fields are concentrated whenever current flows through the electrical conductor, a third insulating layer deposited on top of the ferromagnetic elements, a superconductive element deposited on top of the third insulating layer, a portion only of the cross sectional configuration of which is adjacent the gap defined by the ferromagnetic elements whereby the superconductive element is capable of being switched from a superconductive condition to an electrically resistive condition in response to the combined effect of magnetic fields generated by current flow therethrough and magnetic fields concentrated in the region of the gap by the ferromagnetic elements in response to current flow through the electrical conductor.

12. Apparatus in accordance with claim 11 in which said electrical conductor comprises a superconductive circuit loop which is adapted to sustain a persistent circulating current flow which when once established continues to flow so long as the entire circuit loop remains superconducting.

13. A superconductive switching device including the combination of a conductor which is capable of passing an electrical current to produce a magnetic field, a ferromagnetic element positioned in the region of the magnetic field produced by current flow through the conductor, said ferromagnetic element being constructed of a substance having a relatively high retentivity whereby the ferromagnetic element is placed in a condition of magnetization in response to current flow through the conductor which continues to be present after the cessation of current flow through the conductor, a gate element positioned adjacent the ferromagnetic element, said gate element being constructed of a superconductive material which is capable of being switched from a superconductive condition to an electrically resistive condition in response to an applied magnetic field, said ferromagnetic element being adapted to cooperate with said gate element to apply a magnetic field to a portion only of the cross sectional configuration of the gate element, said magnetic field being produced by an initial current flow through the electrical conductor and continuing in effect after the cessation of current flow through the electrical conductor, whereby there is applied to the gate element a bias magnetic field by the ferromagnetic element which when taken in combination with the effect produced by a current flow through the gate element is capable of rendering the gate element electrically resistive.

References Cited in the file of this patent

UNITED STATES PATENTS

| | | |
|---|---|---|
| 2,930,908 | McKeon | Mar. 29, 1960 |
| 2,944,211 | Richards | July 5, 1960 |
| 2,979,668 | Dunlap | Apr. 11, 1961 |

OTHER REFERENCES

Garwin: "An Analysis of the Operation of a Persistent-Supercurrent Memory Cell," IBM Journal, Oct. 1957, pp. 304–308.

Begum: "Magnetic Recording," Murray Hill Books Inc., New York, N.Y., 1949, page 50.